United States Patent
Otake

(10) Patent No.: US 9,812,014 B2
(45) Date of Patent: Nov. 7, 2017

(54) DRIVING ASSISTANCE SYSTEM FOR IDENTIFYING STOPPING POINTS

(71) Applicant: Hirotada Otake, Toyota (JP)

(72) Inventor: Hirotada Otake, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 67 days.

(21) Appl. No.: 14/433,777

(22) PCT Filed: May 23, 2013

(86) PCT No.: PCT/JP2013/064410
§ 371 (c)(1),
(2) Date: Apr. 6, 2015

(87) PCT Pub. No.: WO2014/076986
PCT Pub. Date: May 22, 2014

(65) Prior Publication Data
US 2015/0279212 A1 Oct. 1, 2015

(30) Foreign Application Priority Data

Nov. 14, 2012 (JP) .................................. 2012-250599

(51) Int. Cl.
*G08G 1/13* (2006.01)
*G08G 1/127* (2006.01)
(Continued)

(52) U.S. Cl.
CPC .............. *G08G 1/13* (2013.01); *G01C 21/34* (2013.01); *G08G 1/0112* (2013.01); *G08G 1/127* (2013.01);
(Continued)

(58) Field of Classification Search
None
See application file for complete search history.

(56) References Cited

U.S. PATENT DOCUMENTS

| 6,037,881 A * | 3/2000 | Bornhauser ............ G01C 21/26 340/906 |
| 2008/0204277 A1 * | 8/2008 | Sumner ..................... G08G 1/08 340/910 |

(Continued)

FOREIGN PATENT DOCUMENTS

| JP | 2005-174314 A | 6/2005 |
| JP | 2007-41916 A | 2/2007 |
| JP | 2007-109001 A | 4/2007 |

*Primary Examiner* — Rami Khatib
*Assistant Examiner* — Jeffrey Boomer
(74) *Attorney, Agent, or Firm* — Sughrue Mion, PLLC

(57) ABSTRACT

A system for assisting vehicle driving includes a processor executing a process of assisting vehicle driving; and a memory. The process includes communicating with vehicles to obtain the travel information, storing the travel information in the memory; estimating a target stop position where the vehicle should stop based on the travel information; transmitting the target stop position to the vehicles-obtaining an index indicating at least one of repeatability of driving behavior of a driver, proximity of the behavior to an average value of others, and fuel consumption, determining a first driver corresponding to the index indicating a value less than a value determined based on the travel information of others; and eliminating a stop position information form the travel information stored in the memory, the stop position information indicating a stop position based on the travel information of the vehicle driven by the first driver.

3 Claims, 6 Drawing Sheets

(51) Int. Cl.
*G08G 1/16* (2006.01)
*G01C 21/34* (2006.01)
*G08G 1/01* (2006.01)

(52) U.S. Cl.
CPC ............ *G08G 1/164* (2013.01); *G08G 1/166* (2013.01); *G08G 1/167* (2013.01)

(56) References Cited

U.S. PATENT DOCUMENTS

| | | | |
|---|---|---|---|
| 2011/0102195 A1* | 5/2011 | Kushi | G08G 1/096716 340/905 |
| 2012/0010803 A1* | 1/2012 | Min | G08G 1/123 701/117 |
| 2014/0046581 A1* | 2/2014 | Ota | G08G 1/096716 701/408 |
| 2014/0285331 A1* | 9/2014 | Otake | G08G 1/16 340/435 |
| 2014/0303868 A1* | 10/2014 | Otake | B60T 7/12 701/70 |
| 2015/0042463 A1* | 2/2015 | Hiramatsu | G08G 1/0112 340/439 |
| 2015/0298565 A1* | 10/2015 | Iwamura | B60L 11/1844 701/22 |
| 2016/0209845 A1* | 7/2016 | Kojo | G01C 21/3407 |

\* cited by examiner

FIG.6

(PLACE A)

| | HISTORY OF STOP POSITIONS (○)<br>INDIVIDUAL SET VALUE (△) | INDIVIDUAL CHARACTERISTIC<br>(DIFFERENCE BETWEEN<br>INDIVIDUAL △ AND TOTAL ◎) |
|---|---|---|
| DRIVER 1 | ○   ○  △⃝⃝⃝ | -1m |
| DRIVER 2 | ○△⃝⃝⃝   ○ | -5m |
| DRIVER 3 | ○△⃝⃝⃝ | -8m |
| DRIVER 4 | ○   ○  △⃝⃝⃝   ○ | +9m |
| DRIVER 5 | ○  △⃝⃝⃝ | +7m |
| TOTAL SET VALUE | ◎ | |

(PLACE B)

| | HISTORY OF STOP POSITIONS (○)<br>INDIVIDUAL SET VALUE (△)<br>TOTAL SET VALUE (×) ESTIMATED FROM<br>INDIVIDUAL CHARACTERISTIC | INDIVIDUAL CHARACTERISTIC<br>(DIFFERENCE BETWEEN<br>INDIVIDUAL △ AND TOTAL ◎) |
|---|---|---|
| DRIVER 1 | ○   ○  △×⃝⃝⃝ ○ | -1m |
| DRIVER 2 | ○ △⃝⃝⃝ ×  ○ | -5m |
| DRIVER 3 | NO DATA | |
| DRIVER 4 | NO DATA | |
| DRIVER 5 | NO DATA | |
| TOTAL SET VALUE | ◎ | |

FIG.7
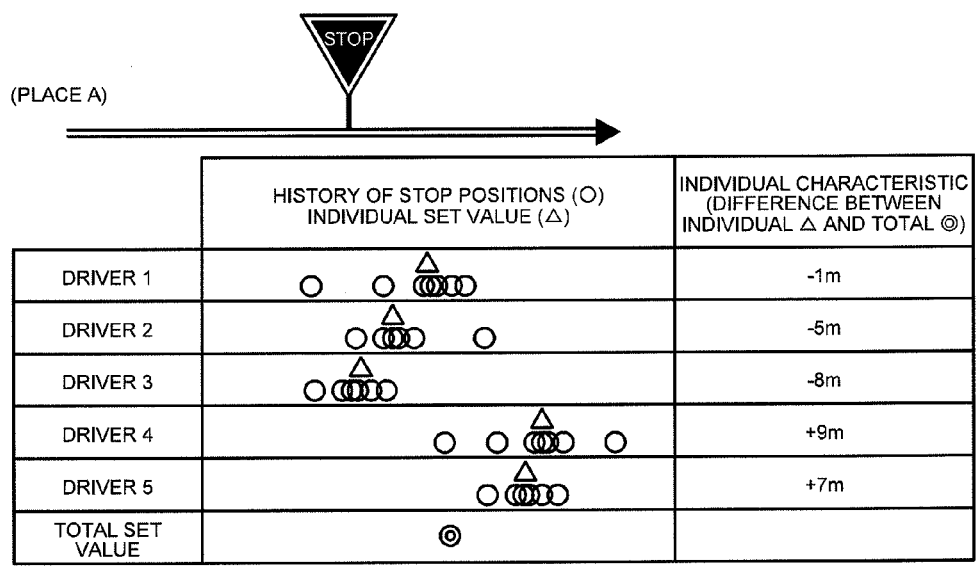
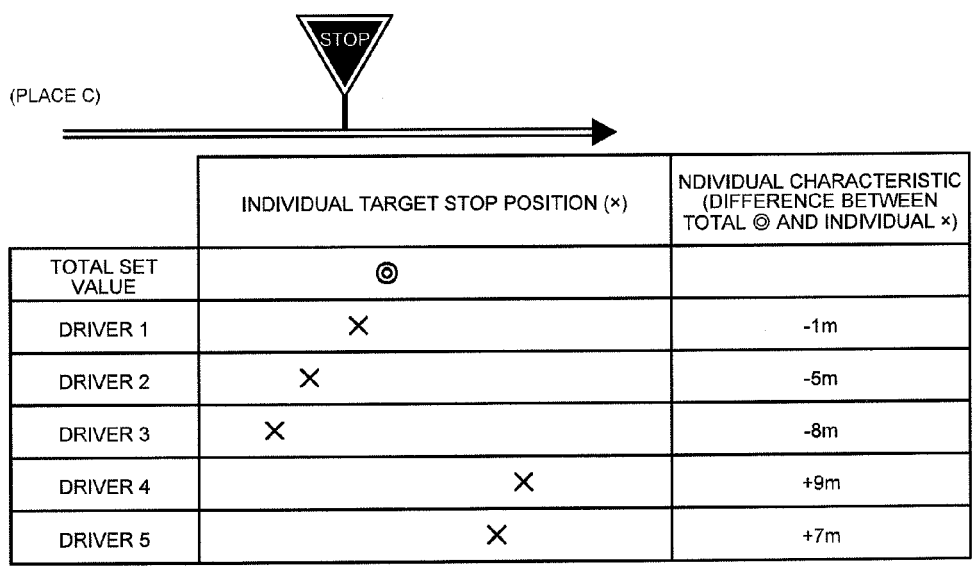

DRIVING ASSISTANCE SYSTEM FOR IDENTIFYING STOPPING POINTS

CROSS REFERENCE TO RELATED APPLICATIONS

This application is a National Stage of International Application No. PCT/JP2013/064410 filed May 23, 2013, claiming priority based on Japanese Patent Application No. 2012-250599, filed Nov. 14, 2012, the contents of all of which are incorporated herein by reference in their entirety.

FIELD

The present invention relates to a driving assistance system.

BACKGROUND

Recently, a system which communicates between a vehicle and a base station to obtain information on a road on which the vehicle travels is suggested. For example, in a road information creation/distribution device disclosed in Patent Literature 1, each vehicle transmits position information of a position at which the vehicle stops to a base station and the base station aggregates information of a target stop position at which the vehicle should stop and transmits the same to the vehicle. According to this, it is possible to notify a driver of the vehicle of information of a spot at which the vehicle should temporarily stop which is not registered on a map database of a car navigation system mounted on the vehicle, thereby assisting the driver to stop.

CITATION LIST

Patent Literature

Patent Literature 1: Japanese Laid-open Patent Publication No. 2005-174314

SUMMARY

Technical Problem

However, each driver of the vehicle has a different driving feature, so that there might be variation in stop position even when they travel on the same road. Therefore, there is a room for improvement in aggregating the information of the position at which the vehicle should stop based on data of the stop position transmitted from each vehicle in order to make the target stop position transmitted to the vehicle closer to an actual position at which the vehicle should stop.

The present invention is achieved in view of the above and an object thereof is to provide a driving assistance system capable of improving accuracy of estimating the target stop position of the vehicle.

Solution to Problem

To solve the above-described problem and achieve the object, a driving assistance system according to the present invention includes a center configured to: obtain and integrate travel information of a plurality of vehicles by communicating with the vehicles; estimate a target stop position being a position at which the vehicle should stop based on the travel information; transmit the target stop position to the vehicle, and the center is configured to; obtain an index indicating a convergence property of driving behavior of a driver of each of the vehicles from the travel information; and eliminate stop position information based on the travel information of the vehicle driven by the driver with a low convergence property from an aggregate on the center based on the index.

Advantageous Effects of Invention

The driving assistance system according to the present invention has an effect of improving the accuracy of estimating the target stop position of the vehicle.

BRIEF DESCRIPTION OF DRAWINGS

FIG. 6 is an illustrative diagram when a reference point is set and assistance information is generated.
FIG. 7 is an illustrative diagram when a target value suitable to individual personality is set.

DESCRIPTION OF EMBODIMENTS

An embodiment of a driving assistance system according to the present invention is hereinafter described in detail with reference to the drawings. Meanwhile, the present invention is not limited by the embodiment. Components in the following embodiment include a component easily replaced by one skilled in the art or a substantially identical component.

Embodiment

Figure 1:
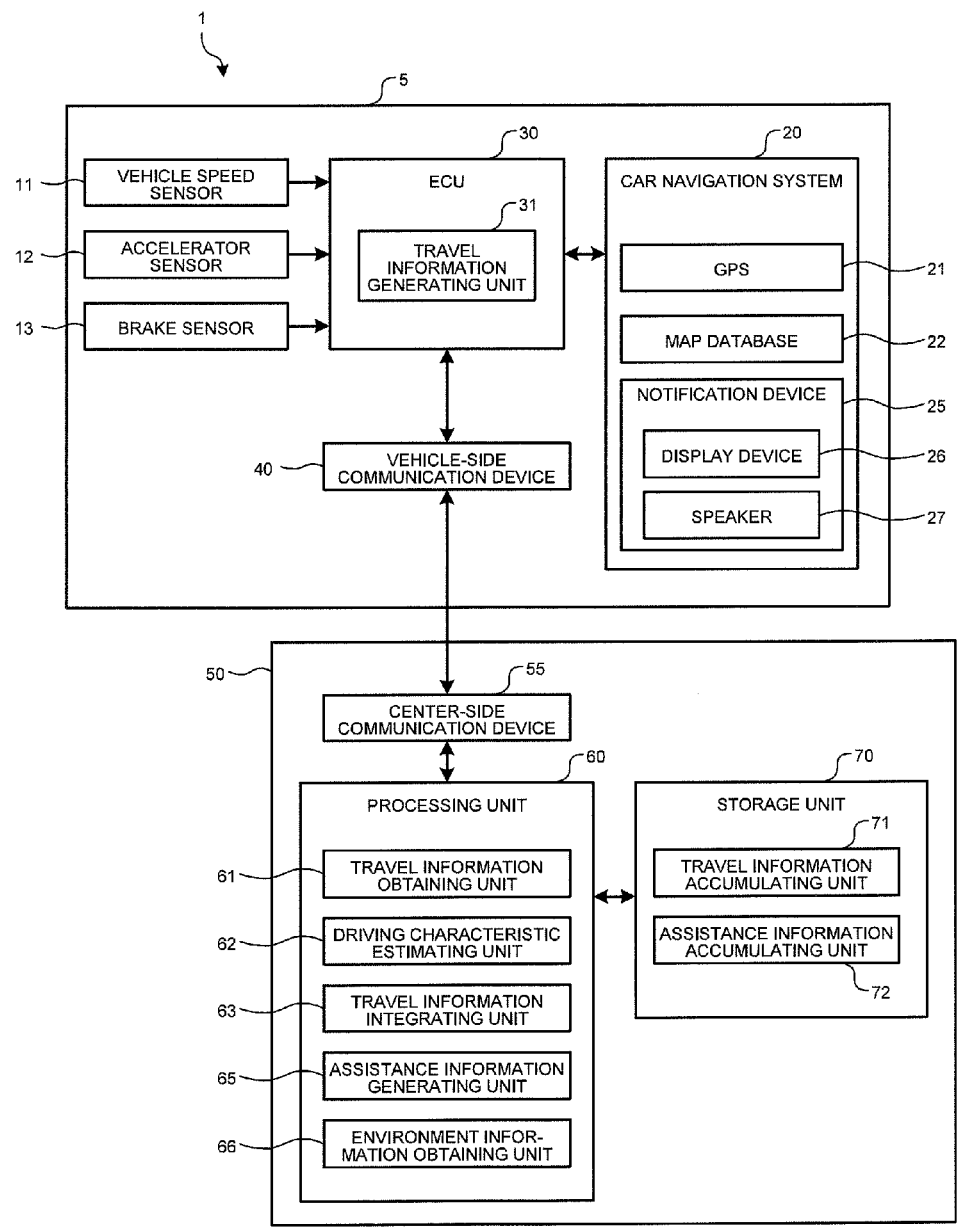
FIG. 1 is a schematic diagram of a driving assistance system according to an embodiment.

FIG. 1 is a schematic diagram of a driving assistance system according to an embodiment. A driving assistance system 1 which assists driving of a traveling vehicle 5 is configured of the vehicle 5 and a center 50 being a base station which communicates with a plurality of vehicles 5. Out of them, the vehicle 5 is provided with a car navigation system 20 and the car navigation system 20 includes a global positioning system (GPS) 21, a map database 22, and a notification device 25. According to this, the car navigation system 20 may obtain a road on which the vehicle 5 currently travels on the map database 22 by overlapping a current position of the vehicle 5 obtained by the GPS 21 with the map database 22.

The notification device 25 includes a display device 26 which displays an image and character information and a speaker 27 which produces a sound such as a voice and a warning sound. According to this, the car navigation system 20 notifies a driver of information such as the road on which the vehicle 5 currently travels and a route to a destination by means of the display device 26 and the speaker 27.

The vehicle 5 is also provided with detecting means which detects a travel state of the vehicle 5 such as a motion state of the vehicle 5 and a driving operation state of the driver at the time of the travel. A vehicle speed sensor 11 which detects a vehicle speed when the vehicle 5 travels is provided, for example, as the detecting means which detects the motion state of the vehicle 5. An accelerator sensor 12 which detects an operation amount of an accelerator pedal (not illustrated), a brake sensor 13 which detects an operation state of a brake pedal (not illustrated) are provided as the detecting means which obtains the driving operation state of the driver.

The detecting means such as the vehicle speed sensor 11, the accelerator sensor 12, and the brake sensor 13 and the car navigation system 20 are connected to an electronic control unit (ECU) 30 mounted on the vehicle 5 to control each unit of the vehicle 5. A hardware configuration of the ECU 30 is a well-known configuration provided with a processing unit which includes a central processing unit (CPU) and the like, a storage unit such as a random access memory (RAM) and the like, so that description thereof is omitted.

The vehicle speed sensor 11, the accelerator sensor 12, and the brake sensor 13 may transmit detection results to the ECU 30. The car navigation system 20 may be controlled by the ECU 30 and may transmit information such as the current position of the vehicle 5 on the map database 22 from the car navigation system 20 to the ECU 30. The ECU 30 includes a travel information generating unit 31 which associates the detection results by the detecting means with the information of the current position of the vehicle 5 which may be obtained by the car navigation system 20 to generate the travel information of the vehicle 5.

The vehicle 5 is also provided with a vehicle-side communication device 40 being a communication device which communicates with the center 50 by radio. The vehicle-side communication device 40 includes a transmission device (not illustrated) which places information on an electric wave being a carrier wave to transmit and a reception device (not illustrated) which receives the electric wave from the center 50 to extract the information placed on the electric wave. The vehicle-side communication device 40 connected to the ECU 30 as in the case of the car navigation system 20 and the like may deliver signals to/from the ECU 30.

The center 50 includes a center-side communication device 55 including a transmission device and a reception device as in the case of the vehicle-side communication device 40 in the vehicle 5. The vehicle 5 and the center 50 may communicate with each other by transmission/reception between the vehicle-side communication device 40 and the center-side communication device 55. The center 50 may communicate with a plurality of vehicles 5 by performing radio communication with the vehicles 5 in this manner.

The center 50 includes a processing unit 60 which performs various arithmetic processes and a storage unit 70 which stores information; out of them, the processing unit 60 has a well-known configuration provided with a CPU, a RAM and the like as in the case of the ECU 30 of the vehicle 5. The processing unit 60 is connected to the center-side communication device 55 such that the processing unit 60 may deliver the information to/from the vehicle 5 by means of the vehicle-side communication device 40 and the center-side communication device 55.

The processing unit 60 includes a travel information obtaining unit 61 which obtains the travel information of a plurality of vehicles 5 through the communication with the vehicles 5, a driving characteristic estimating unit 62 which estimates an index indicating a convergence property of driving behavior of the driver of the vehicle 5 from the travel information, a travel information integrating unit 63 which integrates the travel information of the vehicle 5, an assistance information generating unit 65 which generates driving assistance information when the vehicle 5 travels, and an environment information obtaining unit 66 which obtains environment information of the road on which the vehicle 5 travels. The processing unit 60 is also connected to the storage unit 70 which may store the information, and the storage unit 70 includes a travel information accumulating unit 71 which accumulates the travel information of a plurality of vehicles 5 and an assistance information accumulating unit 72 which accumulates information used when the driving assistance is performed.

Figure 2:
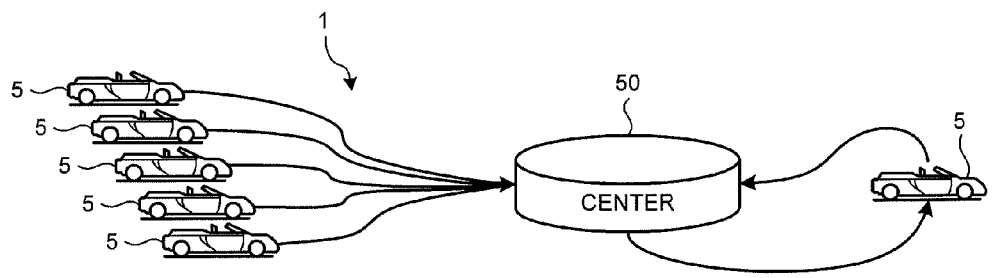
FIG. 2 is a conceptual diagram when the driving assistance system illustrated in FIG. 1 is used.

The driving assistance system 1 according to this embodiment has the above-described configuration; an action thereof is hereinafter described. FIG. 2 is a conceptual diagram when the driving assistance system illustrated in FIG. 1 is used. The driving assistance system 1 according to this embodiment accumulates the travel information of a plurality of vehicles 5 by communicating with a plurality of vehicles 5.

Specifically, when the vehicle 5 travels, the travel information generating unit 31 of the ECU 30 associates the vehicle speed detected by the vehicle speed sensor 11, the operation states of the accelerator pedal and the brake pedal detected by the accelerator sensor 12 and the brake sensor 13, and the map database 22 of the car navigation system 20 with one another. That is to say, the travel information generating unit 31 generates the travel information of the vehicle 5 such as the information on where on the map database 22 the vehicle 5 travels and at what speed the vehicle 5 travels, and the information on where on the map database 22 the driver performs the accelerator operation and the brake operation and how the driver performs them.

According to this, a deceleration position and a stop position on the map database 22, a speed at which a vehicle passes through a curve and the like are generated as the travel information, for example. Meanwhile, other information may also be generated as the travel information; a road gradient may also be generated based on the vehicle speed with respect to the operation amount of the accelerator pedal, for example.

The travel information is generated by a plurality of vehicles 5 capable of communicating with the center 50 and the travel information of each vehicle 5 is transmitted to the center 50 by the radio communication between the vehicle-side communication device 40 and the center-side communication device 55. The center 50 receives the travel information transmitted from a plurality of vehicles 5 in this manner, summarizes the travel information by the processing unit 60, then generates the assistance information used in driving assistance of the vehicle 5, and transmits the same to the vehicle 5. Next, a procedure from the reception of the travel information to the transmission of the assistance information by the center 50 is described.

Figure 3:
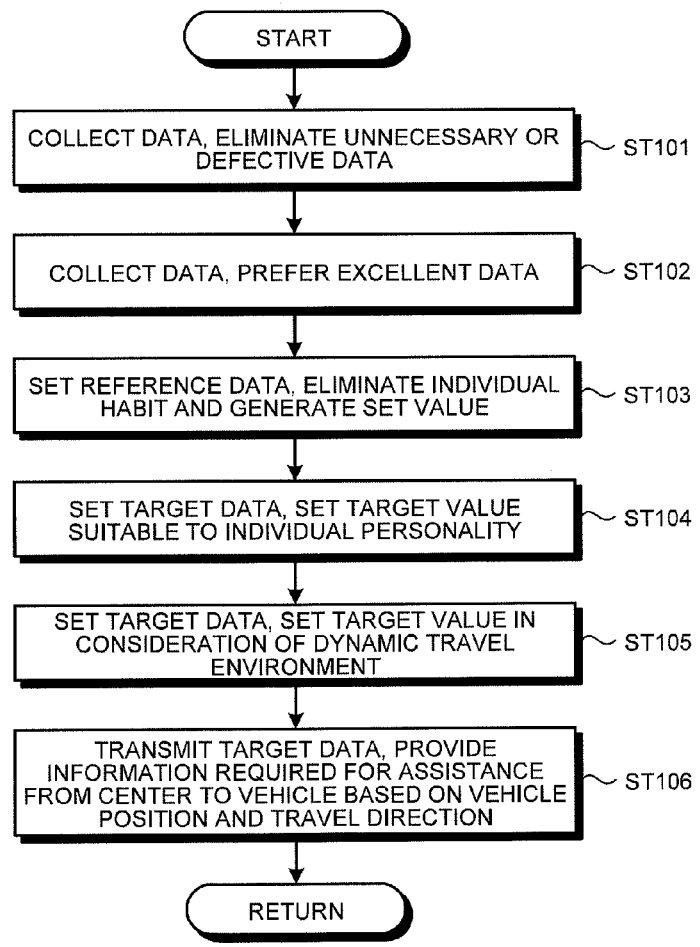
FIG. 3 is a flow diagram when the driving assistance system illustrated in FIG. 1 performs driving assistance.

FIG. 3 is a flow diagram when the driving assistance system illustrated in FIG. 1 performs the driving assistance. When the center 50 generates the assistance information used in the driving assistance of the vehicle 5 to transmit to the vehicle 5, data is first collected (steps ST101 and ST102), reference data is set (step ST103), target data is set (steps ST104 and ST105), and the target data is transmitted to the vehicle 5 (step ST106), and according to this, the assistance information is transmitted.

When the data is collected for generating the assistance information, the center 50 receives the travel information transmitted from a plurality of vehicles 5, and the travel information obtaining unit 61 of the processing unit 60 obtains the travel information. The center 50 integrates the travel information from a plurality of vehicles 5, summarizes the travel information of each spot on the map, and stores the same to accumulate in the travel information accumulating unit 71 of the storage unit 70.

When the travel information is summarized, unnecessary data or defective data is eliminated (step ST101). The driving characteristic estimating unit 62 included in the processing unit 60 obtains the index indicating the convergence property of the driving behavior of the driver of the vehicle 5 from the travel information, and the unnecessary data or the defective data is eliminated based on the index indicating the convergence property.

The driving characteristic estimating unit 62 of the processing unit 60 estimates features of driving such as repeatability of the behavior at the time of driving of the vehicle 5 by the driver, proximity of the behavior to an average value of others, and fuel consumption, for example, as the index indicating the convergence property from the travel information of the vehicle 5 driven by the driver. The center 50 uses the driving feature as the index indicating the convergence property.

Driving quality of the driver is determined from the estimated driving feature of the driver and when the estimated driving feature of the driver is determined to be inferior to the driving features of other drivers, the travel information integrating unit 63 of the processing unit 60 eliminates data of the travel information of the driver as the unnecessary data or the defective data.

The data may be eliminated when the travel information obtained by the travel information obtaining unit 61 is accumulated in the travel information accumulating unit 71 of the storage unit 70, or the data of the travel information of the driver determined to have the driving feature inferior to that of other drivers may be eliminated from the travel information accumulated in the travel information accumulating unit 71. According to this, the travel information integrating unit 63 eliminates the data of the travel information of the driver determined to be the unnecessary data or the defective data because of the driving feature of the driver inferior to that of other drivers from the integrated travel information.

An example of determining whether the driving feature of the driver is inferior to that of other drivers is as follows: when the speed and the stop position are not stable, when day-by-day variation in the travel information is large, of when identity of tendency of difference in characteristic in the travel information data of a plurality of a reference points set on the map is low, the driving feature is determined to be not excellent.

Figure 4:
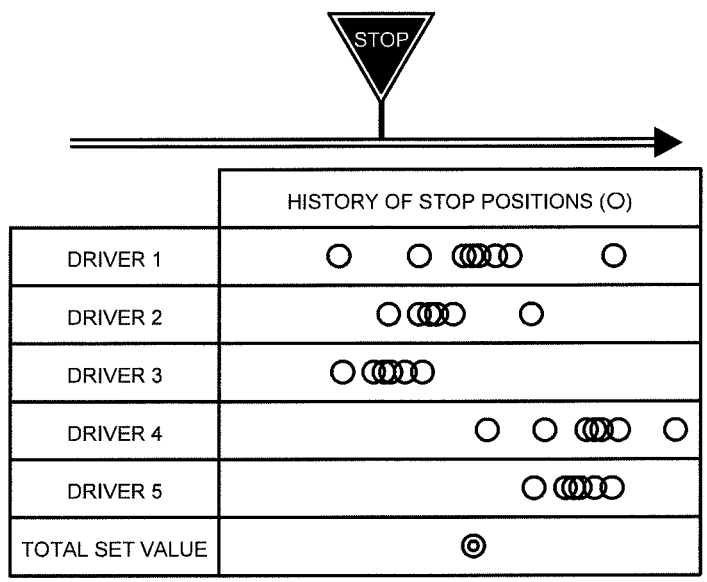
FIG. 4 is an illustrative diagram of a state in which variation in travel information is large.

FIG. 4 is an illustrative diagram of a state in which the variation in the travel information is large. For example, on a road on which it is required to temporarily stop, when a history of the stop positions of each driver is obtained based on the travel information of each of five vehicles 5 driven by drivers 1 to 5 as illustrated in FIG. 4, the history of the driver with large variation in the history is eliminated. In FIG. 4, the history of the stop positions is indicated by ○ and a horizontal direction in the drawing is a travel direction of the vehicle 5. Therefore, when positions of ○ are close to one another in the horizontal direction, the stop positions during the travel of the vehicle 5 are close to one another, and when the positions of ○ are away from one another in the horizontal direction, the stop positions during the travel of the vehicle 5 are away from one another. In FIG. 4, a total set value being a value obtained by integrating the travel information of a plurality of vehicles 5 is indicated by ⊚.

The elimination of the history of the driver with the large variation in the history is described with reference to FIG. 4; the histories of the stop positions (○) of the drivers 2, 3, and 5 are different among the drivers, but the history of the stop positions (○) of each driver falls within a relatively small range in the horizontal direction. This means that variation in the driving behavior is small for the drivers 2, 3, and 5. In contrast, as for the drivers 1 and 4, the positions in the histories of the stop positions (○) are recorded across a wide range in the horizontal direction. This means that the variation in the driving behavior is large for the drivers 1 and 4, and in this case, the travel information integrating unit 63 eliminates the histories of the stop positions (○) of the drivers 1 and 4 and calculates the total set value (⊚) from an average value of the histories of the stop positions (○) of the drivers 2, 3, and 5.

In addition to the stop position of the vehicle 5, when the speed of the vehicle 5 is much higher or lower than the speeds of other vehicles 5 or a legal speed, when a value of the difference in characteristic of the travel information data of the reference points is significantly different from that of the travel information data of other vehicles 5, or when actual fuel consumption is not excellent, it is determined that the driving feature is not excellent.

Furthermore, in addition to the variation in the driving, the driving characteristic estimating unit 62 estimates whether a current driving feature of the driver of the vehicle 5 is different from previous driving features and uses the same as the index indicating the convergence property, and if the current driving feature is different from the previous driving features, the travel information integrating unit 63 deletes current travel information data.

It is determined that the current driving feature is different from the previous driving features when it is detected that the travel speed, acceleration, the stop position and the like of the vehicle 5 are different from usual ones, and that the driver is drunk or tired or calling by a mobile phone, for example, as a method of determining whether the current driving feature is different from the previous driving features.

In this manner, the driving characteristic estimating unit 62 estimates to obtain the index indicating the convergence property of the driving behavior of the driver of the vehicle 5 from the travel information obtained by the travel information obtaining unit 61 and the travel information integrating unit 63 eliminates the travel information based on the index, thereby eliminating the travel information of singular driving behavior such as the unnecessary data or the defective data. According to this, stop position information based on the travel information of the vehicle 5 driven by the driver whose driving behavior poorly converges is eliminated from an aggregate on the center 50.

Next, excellent data in the data collection is preferred (step ST102). That is to say, when the driving feature of the driver estimated by the driving characteristic estimating unit 62 based on the travel information is more excellent than that of other drivers, the travel information of the driver is reflected with a heavier weight in generation of the assistance information used in the driving assistance of the vehicle 5.

An example of determining whether the driving feature of the driver is more excellent than that of other drivers is as follows: it is determined based on the repeatability of the behavior when the vehicle 5 travels, the proximity to the average value of a plurality of pieces of travel information, the fuel consumption and the like, and when they are excellent, it is determined that the driving feature is excellent.

Figure 5:
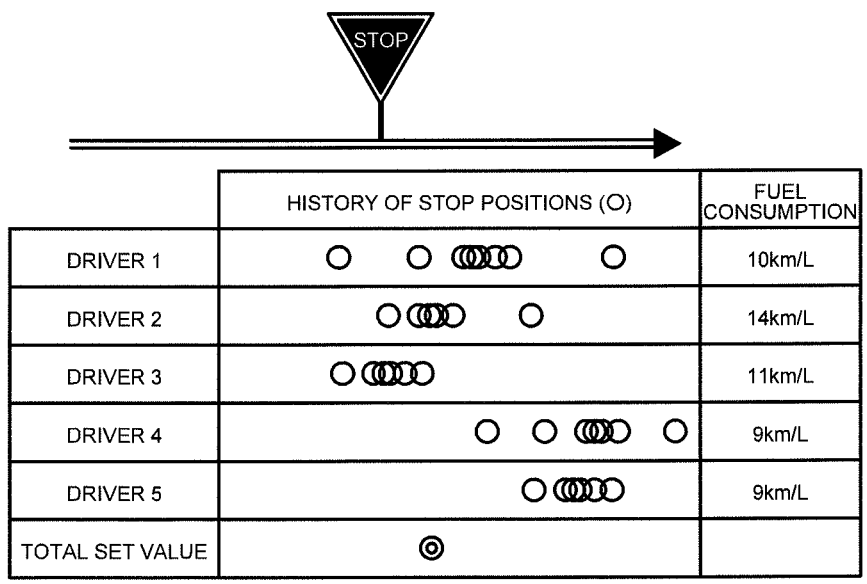
FIG. 5 is an illustrative diagram of preference for the travel information.

FIG. 5 is an illustrative diagram of preference for the travel information. For example, when the travel information generating unit 31 of the ECU 30 included in the vehicle 5 generates the travel information, this also generates information of the fuel consumption. The travel information obtaining unit 61 included in the processing unit 60 of the center 50 obtains the travel information including the information of the fuel consumption and uses the information of the fuel consumption as well as the history of the stop positions (○) and the like as the travel information for each vehicle 5, that is to say, for each driver as illustrated in FIG. 5. The travel information integrating unit 63 compares pieces of the travel information of the drivers and determines that the travel information of the driver with an excellent state of the history of the stop positions (○) and excellent fuel consumption is the travel information with the excellent driving feature.

For example, when it is determined whether the driving feature is excellent based on the history of the stop positions (○), it is determined that the travel information of the driver whose history of the stop positions (○) falls within a small range is the travel information with the excellent driving feature. Therefore, in the example illustrated in FIG. 5, since the history of the stop positions (○) of the driver 3 falls within a range smaller than that of the histories of the stop positions (○) of other drivers, the travel information of the driver 3 is determined to have the excellent driving feature. In the travel information of the driver 2, the fuel consumption is more excellent than that of other drivers, so that the travel information of the driver 2 is also determined to have the excellent driving feature. When the travel information integrating unit 63 integrates the travel information to estimate the total set value (⊚), this integrates by putting a heavier weight on the travel information determined to have the excellent driving feature in this manner.

Meanwhile, when sufficient pieces of the travel information of the drivers determined to have the excellent driving feature are obtained, it is also possible to integrate the assistance information only from the pieces of the travel information with the excellent driving feature to generate the assistance information not only by integrating by simply putting a heavier weight on the travel information.

Next, basic data is set by eliminating an individual habit and generating a set value (step ST103). Specifically, the travel information integrating unit 63 sets a spot at which many changes in travel information are gathered on the map as the reference point and the assistance information generating unit 65 of the processing unit 60 generates the assistance information used in the driving assistance of the vehicle 5 at the reference point. The assistance information with which the driving of the driver is assisted is generated by estimation of information serving as a target at the time of driving of the driver who drives the vehicle 5 such as a target stop position at which the vehicle 5 should stop.

Furthermore, the assistance information generating unit 65 extracts the difference in characteristic at the reference point between the travel information of each vehicle 5 and the assistance information, eliminates the difference in characteristic from the travel information of each vehicle 5, and corrects the travel information. The assistance information generating unit 65 generates the assistance information at a spot at which the change in travel information are not gathered a lot based on the corrected travel information. According to this, the assistance information generating unit 65 generates the assistance information from which an individual driving characteristic is eliminated across a wide range on the map.

FIG. 6 is an illustrative diagram when the reference point is set and the assistance information is generated. For example, when the history of the stop positions is used as the travel information, as illustrated in FIG. 6, a place A being a spot at which many histories of the stop positions (○) of the drivers being targets from which the travel information is collected are gathered is set as the reference point on the map. At the place A being the reference point, the history of the stop positions (○) of each driver is obtained, an individual set value is obtained from the obtained history of the stop positions (○), and difference between the individual set value and the total set value is obtained. According to this, an individual characteristic is estimated. Meanwhile, in FIG. 6, the individual set value is indicated by Δ. Therefore, the difference between the individual set value (Δ) and the total set value (⊚) is difference in a horizontal direction between Δ and ⊚ in the drawing.

Furthermore, as illustrated in FIG. 6, at a place B at which the travel information of the driver 1 and that of the driver 2 are obtained but there is no data of the travel information of the drivers 3 to 5, the total set value (⊚) is estimated based on the travel information of the driver 1 and that of the driver 2. Specifically, the individual characteristic of each driver at the place A is applied to the place B and a total set value estimated from an individual is obtained for each driver having the data of the travel information at the place B. In FIG. 6, the total set value estimated from the individual characteristic is indicated by x.

That is to say, the individual set value (Δ) is obtained based on the history of the stop positions (○) of the driver 1 at the place B, and the total set value (x) estimated from the individual characteristic of the driver 1 is obtained by using the individual set value (Δ) and the individual characteristic estimated at the place A. The total set value (x) estimated from the individual characteristic of the driver 2 is obtained by a similar method. The total set value (⊚) at the place B is estimated from the total set value (x) estimated from the individual characteristic of the driver 1 and the total set value (x) estimated from the individual characteristic of the driver 2. In this manner, at the spot with little travel information data, the total set value is estimated by using the travel information which can be obtained at the spot and the individual characteristic at the reference point.

Next, the target data is set by setting of a target value suitable to individual personality (step ST104). That is to say, the individual characteristic is determined from the characteristic such as timing to turn off the accelerator of an individual past learning value and the total set value. The target value of the driving assistance to the individual is modified based on the individual characteristic determined in this manner. Meanwhile, the target value in this case is the value being the target of the travel state of the vehicle 5 and the driving state of the driver for securing travel stability and allowing the vehicle 5 to travel according to an intention of the driver when the driving assistance is performed to the driver who drives the vehicle 5.

When the target value is modified based on the individual characteristic, the characteristic of the travel information of the vehicle 5 being the target of the assistance is determined from the characteristic such as the timing to turn off the accelerator in the past travel information of the vehicle 5 and the total set value of the travel information of a plurality of vehicles 5, and the target value of the driving assistance to the vehicle 5 is modified based on the determined characteristic of the travel information. For example, to the driver who usually stops one meter before the stop position in the set value of the travel information, the driving assistance is performed in consideration of this tendency such that the assistance information with which the driving assistance of the driver of each vehicle 5 is performed conforms to the individual characteristic of the driver.

FIG. 7 is an illustrative diagram when the target value suitable to the individual personality is set. For example, when a target stop position is set as the target value at a place C at which the driver being the target for which the target value is set has less opportunity to travel, this is estimated based on the total set value (◎) at the place C and the data at the place A at which the individual characteristic may be estimated. Meanwhile, in FIG. 7, an individual target stop position for each driver is indicated by x.

When the individual target stop position (x) at the place C is estimated, this is estimated by calculation of difference between the total set value (◎) at the place C and the individual characteristic of each driver. That is to say, since the individual characteristic is the difference between the individual set value (Δ) and the total set value (◎), it is possible to estimate the individual set value at the place C for each driver by calculating the difference between the total set value (◎) at the place C and the individual characteristic. The individual set value estimated in this manner is set as the individual target stop position (x) of each driver. According to this, the target value according to the individual characteristic is set for each driver.

Next, the target value is set in consideration of a dynamic travel environment (step ST105). That is to say, the environment information obtaining unit 66 included in the processing unit 60 obtains the environment information of the road on which the vehicle 5 travels and modifies the target value of the assistance information of the driving assistance according to the environment information. In this case, the environment information obtaining unit 66 obtains the environment information from traffic jam information used in another traffic system and weather information used in a weather system.

For example, when the traffic jam information indicating that there is a traffic jam on the road on which the vehicle 5 to which the driving assistance is performed travels is obtained, a set vehicle speed used when the assistance information generating unit 65 generates the assistance information, that is to say, a travel vehicle speed for calculating a travel load is set to be lower. When the environment information obtained by the environment information obtaining unit 66 indicates that it rains or snows or that the road is supposed to be frozen, the speed at which the vehicle passes the curve is set to be lower and timing to guide to turn off the accelerator is adjusted to be earlier when the assistance information is generated. When the environment information indicates that it rains, the assistance information is generated in consideration of an increase in load due to rainfall.

Furthermore, when a direction and a speed of wind may be obtained as the environment information, the assistance information is generated in consideration of them, too. For example, when the wind against the traveling vehicle 5 is strong, the travel information is generated such that the timing to guide to turn off the accelerator is adjusted to be later. According to this, the assistance information is generated according to disturbance of the dynamic travel environment at the time of the travel of the vehicle 5 such as the traffic jam and the weather.

Figure 8:
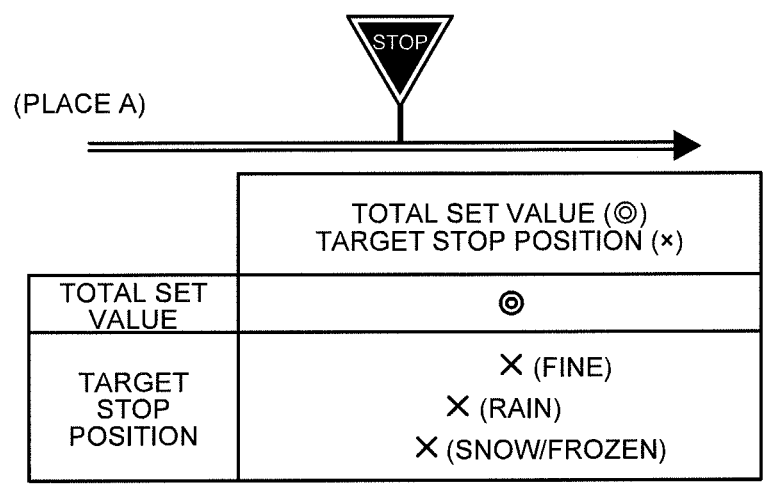
FIG. 8 is an illustrative diagram when the target value is set in consideration of a dynamic travel environment.

FIG. 8 is an illustrative diagram when the target value is set in consideration of the dynamic travel environment. Specifically, as illustrated in FIG. 8, when the target value in the dynamic travel environment is indicated by x, when the weather at the spot at which the target value is set is fine, the target stop position (x) in fine weather is substantially the same position as that of the total set value (◎) of the spot. In contrast, when it rains at this spot, the target stop position (x) in rain is located before the total set value (◎) at this spot in the travel direction of the vehicle 5, that is to say, this is set in a direction in which the timing to stop becomes earlier.

Furthermore, when it snows or the road surface is frozen at this spot, the target stop position (x) in snow or when the road is frozen is set in the direction in which the timing to stop becomes earlier from the total set value (◎) at this spot and set in the direction in which the timing to stop becomes earlier from the target stop position (x) in rain. In this manner, the assistance information generating unit 65 generates the assistance information according to the disturbance of the dynamic travel environment such as the weather by setting the target value according to a situation at the spot at which the assistance information is generated.

Next, the information required for the driving assistance is provided from the center 50 to the vehicle 5 based on the position and the travel direction of the vehicle 5 (step ST106). That is to say, this transmits the target data when performing the driving assistance to the vehicle 5 by transmitting the assistance information generated by the assistance information generating unit 65 to the vehicle 5 by using the center-side communication device 55. According to this, this transmits the assistance information such as the target stop position in the travel direction of the vehicle 5 to the vehicle 5.

The assistance information transmitted from the center 50 is received by the vehicle-side communication device 40 of the vehicle 5 to be transmitted to the ECU 30. The ECU 30 transmits the assistance information to the car navigation system 20. The car navigation system 20 notifies the driver of the assistance information by displaying the same on the display device 26 and producing the warning sound or the voice from the speaker 27. The driver may perform appropriate driving operation such as to stop at an appropriate stop position, for example, by performing the driving operation based on the assistance information notified in this manner.

The driving assistance system according to the above-described embodiment obtains the index indicating the convergence property of the driving behavior of the driver from the travel information of the vehicle 5 and eliminates the stop position information based on the travel information of the vehicle 5 driven by the driver with the low convergence property, so that this may inhibit the variation in the stop position information based on the stop position information of the driver with the low convergence property. That is to say, the stop position information of the driver with variation in the vehicle speed and stop position becomes noise information when the target stop position is estimated, so that it is possible to eliminate the noise information by eliminating the stop position information of such driver. As a result, it is possible to improve accuracy of estimating the target stop position of the vehicle 5.

When the assistance information generating unit 65 of the center 50 generates the assistance information, the travel information of the driver having the excellent driving feature is reflected with a heavier weight, so that excellent assistance information may be generated. As a result, the travel safety of the vehicle 5 to which the driving assistance is performed by provision of the assistance information may be improved.

When the assistance information is generated, this is generated after the difference in characteristic among the drivers is eliminated, so that the convergence property of the assistance information may be improved. It is possible to estimate the travel information and generate the assistance information at the spot at which there is little data of the travel information by eliminating the difference in characteristic of each driver to correct the travel information. As a result, it is possible to generate the assistance information from which the individual driving characteristic is eliminated across a wide range on the map.

Since the target value according to the individual characteristic is set for each driver, it is possible to generate the assistance information appropriate to the characteristic of the driver and perform the driving assistance appropriate to the characteristic of the driver. As a result, it is possible to perform more appropriate driving assistance, so that it is possible to inhibit the driver from feeling uncomfortable and improve the travel safety.

It is possible to perform the driving assistance according to the environment around the traveling vehicle 5 by setting the target value in consideration of the dynamic travel environment such as the weather. As a result, it is possible to perform optimal driving assistance regardless of change in dynamic disturbance such as the traffic jam and the weather.

[Variation] Meanwhile, although the current position of the vehicle 5 is obtained by means of the car navigation system 20 mounted on the vehicle 5 and the driver is notified of the assistance information transmitted from the center 50 in the above-described driving assistance system 1, other devices may be used as the devices and an independent device may be arranged for the driving assistance system 1.

Although it is described that one center 50 transmits/receives the information to/from a plurality of vehicles 5 in the above-described driving assistance system. 1, a plurality of centers 50 of the driving assistance system 1 may be arranged. It is possible to generate the assistance information of a wider range by arranging a plurality of centers 50 and communicating the travel information of the vehicle 5 and the assistance information of the driving assistance between the centers 50 and perform the driving assistance to the vehicle 5 in a wide range.

REFERENCE SIGNS LIST

1 Driving assistance system
5 Vehicle
20 Car navigation system
21 GPS
22 Map database
25 Notification device
30 ECU
31 Travel information generating unit
40 Vehicle-side communication device
50 Center
55 Center-side communication device
60 Processing unit
61 Travel information obtaining unit
62 Driving characteristic estimating unit
63 Travel information integrating unit
65 Assistance information generating unit
66 Environment information obtaining unit
70 Storage unit

The invention claimed is:

1. A system for assisting vehicle driving, the system comprising:
   a central server; and
   a plurality of vehicles including a first vehicle,
   wherein the central server includes:
   a first processor,
   a memory, and
   a server communication device,
   wherein each of the plurality of vehicles includes:
   a second processor,
   a car navigation system,
   variable sensors, and
   a vehicle communication device;
   wherein the first processor and the second processor of each of the plurality of vehicles are configured to cooperate together to determine one or more target stop positions of the first vehicle, and wherein the system is configured to:
   obtain, with the second processor, a travel information of the each of the plurality of vehicles by using the variable sensors, the travel information being an information in which a location indicated by a positional information obtained by the car navigation system is in association with an driving operation performed at the location,
   collect the travel information, with the first processor, from each of the plurality of vehicles via the vehicle communication device and the server communication device and store the collected travel information into the memory,
   refer to, with the first processor, the travel information obtained from the plurality of vehicles at one or more predetermined locations,
   eliminate, with the first processor, the travel information related to a certain driver at the one or more plural predetermined locations from the memory in a case where at least one of following three conditions is satisfied:
   when values indicating a driving operation performed by the certain driver vary more than a predetermined amount;
   when a value indicating the travel information a vehicle of the certain driver differs from an average value of the travel information of the vehicles of other drivers by a predetermined amount or more; and
   when a value indicating a fuel consumption of the vehicle of the certain driver is higher than an average value of the fuel consumption of the vehicles of the other drivers by a predetermined amount or more,
   calculate, with the first processor, the one or more target stop positions for the first vehicle at the one or more predetermined locations based on the travel information stored in the memory, and
   transmit, with the first processor, the calculated one or more target stop positions to the first vehicle as a drive assist information.

2. The system for assisting vehicle driving according to claim 1, wherein the second processor of the first vehicle is configured to assist vehicle driving of the first vehicle based on the one or mere target stop positions received from the first processor.

3. The system for assisting vehicle driving according to claim 1, wherein the driving operation includes an acceleration pedal operation and a brake pedal operation.

* * * * *